United States Patent Office
3,017,382
Patented Jan. 16, 1962

3,017,382
COMPOSITION COMPRISING POLYSULPHIDE POLYMER AND FURFURAL-KETONE REACTION PRODUCT
John D. Faiella, Yonkers, N.Y., assignor, by mesne assignments, to Harvel Research Corporation, Newark, N.J., a corporation of New Jersey
No Drawing. Filed Aug. 8, 1955, Ser. No. 527,142
12 Claims. (Cl. 260—45.5)

This invention relates to novel compositions of matter and to methods for preparing them. In one of its more specific aspects the invention is directed to novel compositions comprising combinations of (A) normally liquid polysulphide polymers and (B) furfural-ketone reaction products or derivatives thereof with or without (C) a glycidyl ether of an aliphatic or aromatic alcohol.

The materials (A) which I have found particularly useful in the production of my novel combinations are the liquid polymers having the average structure of the following:

FORMULA I

HS—($C_2H_4$—O—$CH_2$—O—$C_2H_4$—S—S)$_n$
—$C_2H_4$—O—$CH_2$—O—$C_2H_4$SH in which $n$ is a value of approximately 3–23, examples of which are the liquid products found on the market as "thiokol" products "LP–2," "LP–3," "LP–8" which are essentially materials of said Formula I, with $n$ being respectively 23, 6 and 3–4.

FORMULA II

X—($CH_2CH_2SS.CH_2CH_2O$)$_y$—$CH_2CH_2SS.CH_2CH_2$—X in which X is either OH or SH and $y$ is a value of approximately 3 to 40, examples of which are liquid products found on the market as "Thiokol" products "ZL–184," "ZL–185," "ZL–195" which are essentially materials of Formula II, with X being OH and SH respectively.

The products B employed in the practice of this invention are liquid at 300° F. and are as follows:

(a) Furfural-ketone organic reaction masses produced by reacting furfural and a ketone having at least two hydrogen atoms on an alpha carbon. Generally said reaction is carried out under alkaline conditions to provide organic reaction masses of different viscosities depending upon the ketone employed, the proportion of alkaline catalyst, the time and temperature of reaction. Examples of various ketones which may be employed for providing such organic reaction masses and methods for preparing such reaction masses are disclosed in the U.S. patent to S. Caplan and M. T. Harvey, No. 2,363,829 issued November 28, 1944;

(b) Residues of (a) produced by the heat distillation of (a) and measuring at least 10% and for most purposes at least 60% and generally 60%–95% by weight of (a);

(c) Monofurfural ketone and difurfural ketone respectively, having the following formula:

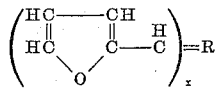

in which $x$ is a whole number selected from the group consisting of 1 and 2 and R is a ketone lacking two of the hydrogen atoms on either one or both of its alpha carbons. These compounds are produced as a result of reaction between the furfural and ketone wherein two hydrogen atoms on the alpha carbons unite with the aldehyde oxygen of the furfural to split off water. These mono- and di-furfural-ketones may be separated from the reaction mass and from each other by heat distillation or any other convenient method. Examples of such mono- and di-furfural-ketone compounds are found in Example 1 of the U.S. patent to M. T. Harvey, No. 2,600,403, issued June 17, 1952;

(d) Homopolymers of (a), (b) and (c) respectively. Said (a)–(c) may be homopolymerized in a number of different ways: for example, by heating them respectively at elevated temperatures of about 180–260° F. in factory practice while in the presence of an acidic or alkaline agent or catalyst, such as diethyl sulphate, sulphuric acid, hydrochloric acid, phosphoric acid, zinc chloride, boron trichloride or the like, sodium hydroxide, potassium hydroxide, lime, sodium carbonate or the like. When such homopolymerization is conducted under acidic conditions, the amount of acidic catalyst employed is such that the pH of the mix is no greater than about 4 and generally between about 0.5–2 and when an alkaline catalyst is employed the amount used is such that the pH of the mix is at least 8 and for most purposes in the range of about 8.5–13. A specific method, given merely for the purposes of illustration, which may be employed to produce said homopolymers (a)–(c) respectively is to charge a quantity of any of them into a container and then there is added thereto a quantity of catalyst either alkaline or acidic to impart a pH to said mix within the ranges heretofore set forth. Then such mix is maintained at approximately 250° F. until a solution of the resultant homopolymers in an equal weight of acetone has a viscosity in centipoises at 25° C. at least 100% greater than that of a solution of the corresponding original product (a)–(c) respectively in an equal weight of acetone. These homopolymers of (a)–(c) are in all cases liquid at 300° F.;

(e) Partially hydrogenated reaction masses (a), and residues (b) and homopolymers (d) respectively;

(f) Partially hydrogenated mono-furfural-ketone;

(g) Partially hydrogenated di-furfural-ketone;

Said materials (e)–(g) are produced by partially hydrogenating (a)–(d) respectively to saturate them with hydrogen to an extent equal to approximately 15%–65% of that required to saturate all of the carbon to carbon double bonds of said materials (a)–(d).

(h) Residues of partially hydrogenated reaction masses (a) measuring at least 10% and for most purposes at least 60% and generally 60%–95% by weight of said partially hydrogenated reaction masses (a) and produced by the heat distillation thereof;

(i) Homopolymers of (e), (f), (g) and (h) respectively, said homopolymerization or thickening being affected by the use of an acidic catalyst, generally with the use of heat. Any of the acidic catalysts may be employed for this purpose and for most purposes in amount sufficient to provide a mix having a pH no greater than 4 and for most purposes 0.3–3. While under the lower pH conditions, the homopolymerization may proceed at room temperature, it is preferable that external heat be used and the high pH, for example 180° F.–450° F. and pH about 2–2.5. In any case, the acid catalyzed mass is maintained within said temperature range until the polymerization or thickening has reached the desired degree as evidenced by an increase in viscosity which in all cases is at least 100% greater than the viscosity of the material treated before polymerization or thickening. In all cases, the heat is removed so that all of the acid polymerized materials so produced are preferably liquids or pourable at room temperature and in any event are liquid at 300° F., that is, that the heat is removed before any of them is converted to the solid infusible state.

Various specific examples of said acid polymerized unhydrogenated materials may be found in said U.S. Patent No. 2,461,510 and other examples of said polymerized unhydrogenated materials may be found in U.S. Patent No. 2,516,317, reference being hereby made to said printed publications. Reference is also made to Patents Nos. 2,600,403 and 2,600,764 showing various acid polymerized hydrogenated materials liquid at 300° F.

(j) Organic reaction products of (a)–(i) respectively and an phenol-reactive aldehyde, that is, an aldehyde capable of reacting with phenol in the presence of a catalyst or condensing agent, examples of which are formaldehyde, paraformaldehyde, trioxane, furfural, glyoxal, polymerized glyoxal, acrolein, polymerized acrolein and acetaldehyde under acidic conditions.

The materials (C) which may be employed are glycidyl polyethers of aliphatic polyhydric alcohols or of polyhydric phenols, said polyethers having a 1,2-epoxy equivalency greater than 1 and being liquid at 300° F.

Said glycidyl polyethers of the aliphatic polyhydric alcohols are obtainable by practicing the methods known to the art, an example of which is to react such alcohol with epichlorhydrin or glycerol dichlorhydrin in the presence of a suitable acidic catalyst, such as boron trifluoride and then converting said reaction product to polyepoxide by employing suitable alkaline agents, such as sodium hydroxide, sodium aluminate, etc. Examples of some of said glycidyl polyethers are those of such alcohols as diethylene glycol, propylene glycol, glycerol, etc., and all of which have a 1,2-epoxide equivalency greater than 1.

The glycidyl polyethers of polyhydric phenols are obtainable by reacting a polyhydric phenol with epichlorhydrin in basic medium at about 50° C. to 150° C. with use of more than 1 mole of epichlorhydrin per equivalent of phenolic hydroxyl group of the phenol and a slight stoichiometric excess of base such as about 2% to 30% excess sodium or potassium hydroxide. The reaction is effected by heating for several hours and the product is then separated from formed salt, excess base; and any unreacted epichlorhydrin. It is usually preferred to employ glycidyl polyether of a dihydric phenol in the invention, which product, instead of being a single simple compound is generally a complex mixture of glycidyl polyethers, but the principal product may be represented by the formula:

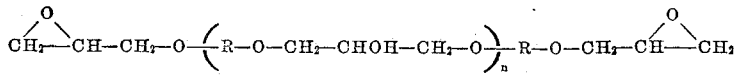

wherein $n$ is an integer of the series 0, 1, 2, 3, . . . and R represents the divalent hydrocarbon radical of the dihydric phenol. While for any single molecule of the polyether $n$ is an integer, the fact that the obtained polyether is a mixture of compounds causes the determined value for $n$, e.g., from molecular weight measurement, to be an average which is not necessarily zero or a whole number. Although the polyether is a substance primarily of the above formula, it may contain some material with one or both of the terminal glycidyl radicals in hydrated form, and in any case, the 1,2-epoxy equivalency is greater than 1.

The simplest of the polyethers is the diglycidyl diether of a dihydric phenol. It contains a single divalent aromatic hydrocarbon radical from the dihydric phenol and has two glycidyl radicals linked thereto by ethereal oxygen atoms. More generally, the polyether of dihydric phenols is of more complex character and contains two or more aromatic hydrocarbon radicals alternating with glyceryl groups in a chain which are linked together by intervening ethereal oxygen atoms.

The 1,2-epoxy equivalency of the glycidyl polyether refers to the number of 1,2-epoxy groups:

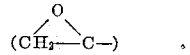

contained in the average molecule of the polyether. The 1,2-epoxy equivalency is thus dependent upon the molecular weight and the epoxide value which is measured as gram equivalents of epoxide per 100 grams of polyether. The 1,2-epoxide value is determined by heating a weighed sample of polyether with an excess of 0.2 N-pyridinium chloride in chloroform solution at the boiling point under reflux for two hours whereby the pyridinium chloride hydrochlorinates the epoxy groups to chlorhydrin groups. After cooling, the excess unreacted pyridinium chloride is back-titrated with 0.1 N-sodium hydroxide in methanol to the phenolphthalein and point. The epoxide value is calculated by considering one HCl as equivalent to one epoxide group. This method is used for obtaining all epoxide values discussed herein.

Any of the various polyhydric phenols is used in preparing polyethers employed in the invention including mononuclear phenols such as resorcinol, catechol, hydroquinone, methyl resorcinol, etc.; or polynuclear phenols like 2,2-bis (4-hydroxyphenyl) propane which is termed bis-phenol herein for convenience, 4,4'-dihydroxybenzophenone, bis (4-hydroxyphenyl)-methane, 1,1-bis (4-hydroxyphenyl) ethane, 1,1-bis (4-hydroxyphenyl) isobutane, 2,2-bis (4-hydroxyphenyl) butane, 2,2-bis (4-hydroxy-2-methylphenyl) propane, 2,2-bis (4-hydroxy-2-tertiary-butylphenol) propane, 2,2-bis (2-hydroxy-naphthyl) pentane, 1,5-dihydroxynaphthalene, etc., as well as more complex polyhydric phenols such as pyrogallol, phloroglucinol, and novolac resins from condensation of a phenol with an aldehyde in the presence of an acidic condensation catalyst. Preparation of glycidyl polyether of novolac resin is described in Example 27 of German Patent No. 676,117.

Other examples of such glycidyl polyethers of bisphenols are those obtainable by reacting epichlorhydrin in a basic medium with the organic reaction products produced by reacting a material selected from the class consisting of hydroxy benzene, naphthol, anthranol and their homologues with a phenol having an unsaturated hydrocarbon substituent, with such reaction products being shown in the U.S. patent to M. T. Harvey, No. 2,317,607 issued on April 27, 1943, and glycidyl polyether of certain of said reaction products being shown in the U.S. patent to D. Wasserman, No. 2,665,266. Still other examples of said glycidyl polyethers of bis-phenols are those which may be derived from any of the other bis-phenols produced according to said Harvy patent. Such bis-phenols may be reacted with epichlorhydrin in the presence of an alkali employing in general the procedure set forth in the aforesaid patent to Wasserman to produce the glycidyl polyethers of said other bis-phenols.

Prior to this invention certain of said materials (A) have been combined with furfuryl alcohol and such compositions have been converted to the solid state. Such end products have been found to have less chemical and thermal resistance and poorer physical characteristics, such as tensile, elongation, impact, etc., when compared with the products of this invention converted to the solid state.

According to this invention, one or a combination of one or more of said materials (A) is combined with one or a combination of two or more of said materials (B) with or without one or a combination of two or more of said materials (C) to provide compositions having greater heat resistance and chemical resistance and toughness than materials (A) and (C) when cured alone or together.

The ratio by weight of the components may vary over wide limits, but for most purposes the ratio by weight of (A) to (B) is in the range of 5 parts of (A) to 100 parts of (B) to 5 parts of (B) to 100 parts of (A). When (C) is also employed as a component of such combinations, (C) is equal to 5–200 parts for each 100 parts of the combined weights of (A) and (B). These novel combinations of the invention find application as coating compositions for glass, asbestos and other woven or matted fabrics and fibers, for wood, metal, concrete, in the manufacture of tapes and cable cloths for electrical insulation, as embedding and caulking compounds, etc.

The following examples are given by way of illustrating combinations of materials (A) and (B), all parts given by weight unless otherwise specified.

Example 1

90 parts of material (B)–1: furfural-acetone organic reaction mass disclosed in Example 1 of U.S. Patent 2,600,403 and identified therein as product A.
10 parts of "Thiokol LP–3."

Example 2

80 parts of material (B)–2: furfural-methyl ethyl ketone organic reaction mass produced according to the method described in the first sentence of Example 4 of U.S. Patent No. 2,363,829.
20 parts of "Thiokol LP–3."

Example 3

5 parts of material (B)–3: monofurfural-acetone, disclosed in Example 1 of U.S. Patent No. 2,600,403 and identified therein as fraction I.
95 parts of "Thiokol LP–2."

Example 4

10 parts of material (B)–4: difurfural-acetone, disclosed in Example 1 of U.S. Patent No. 2,600,403 and identified therein as fraction II.
90 parts of "Thiokol LP–8."

Example 5

90 parts of material (B)–1.
10 parts of "Thiokol LP–2."

Example 6

80 parts of material (B)–1 homopolymerized to a viscosity of 500 cp. at 25° C.
20 parts of "Thiokol LP–2."

Example 7

10 parts of material (B)–5: produced by mixing and heating together 600 lbs. of material (B)–1, 800 cc. of diethyl sulphate and 12 lbs. paraformaldehyde to a temperature of approximately 300° F. whereupon exothermic reaction sets in and external heat is removed. The reaction is allowed to proceed and is evidenced by a thickening of the mass. When the viscosity of the reaction mass is such that a solution at room temperature of a sample thereof in an equal weight of xylol is roughly 10 times that of a solution at room temperature of a sample of the original mixture in an equal weight of xylol, the mass is quickly chilled to room temperature to provide material (B)–5.
90 parts of "Thiokol LP–3."

Example 8

80 parts of material (B)–6: furfural-diacetone alcohol organic reaction mass produced according to method described in the first part of Example 6 of U.S. Patent 2,363,829.
20 parts of "Thiokol ZL–184."

Example 9

20 parts of material (B)–7: furfural-mesityl oxide organic reaction mass produced according to method disclosed in the first part of Example 10 of U.S. Patent 2,363,829.
80 parts of "Thiokol ZL–185."

Example 10

20 parts of material (B)–4.
80 parts of "Thiokol ZL–195."

Example 11

20 parts of material (B)–8: partially hydrogenated furfural-acetone organic reaction mass disclosed in Example IA of U.S. Patent No. 2,600,403 and identified therein as product HA.
80 parts of "Thiokol LP–2."

Example 12

50 parts of material (B)–9: partially hydrogenated difurfural-acetone shown in Example IA of U.S. Patent No. 2,600,403 and identified therein as product HA–2.
50 parts of "Thiokol LP–3."

Example 13

30 parts of material (B)–10: partially hydrogenated furfural-acetone reaction mass disclosed in Example IA of U.S. Patent 2,600,403 and identified therein as product HA, polymerized under acidic conditions to a constant viscosity at 25° C. of 5000 centipoises.
70 parts of "Thiokol LP–8."

Example 14

10 parts of material (B)–1.
90 parts of "Thiokol XL–184."

Example 15

20 parts of material (B)–11: furfural-acetone reaction mass identified in Example 1 herein was polymerized to change its viscosity from 92 centipoises at 25° C. to a viscosity of 300 centipoises at 25° C. and then partially hydrogenating to saturate approximately 30% of the carbon to carbon double bonds therein.

Example 16

10 parts of material (B)–12: partially hydrogenated monofurfural-methyl ethyl ketone shown in Example 2 of U.S. Patent No. 2,600,403 and identified therein as product HB–1.
90 parts of "Thiokol ZL–196."

Solutions of the respective combinations of Examples 1–16 are produced and are hereinafter known as products 1–16 respectively. Solutions may be affected either at room temperature or elevated temperature depending upon whether or not the components thereof are liquid or solid.

The following Examples 17–32 are examples given merely by way of illustrating combinations of materials (A), (B) and (C), all parts being given by weight unless otherwise specified.

Example 17

100 parts of product 1.
10 parts of product (C)–1: 2,2 bis-(parahydroxy phenyl propane) glycidyl polyether having an epoxide equivalent of 190–210.

Example 18

100 parts of product 2.
80 parts of product (C)–2: glycidyl polyether of resorcinol having an epoxide equivalent of 160–180.

Example 19

100 parts of product 3.
100 parts of product (C)–3: glycidyl polyether of glycerine having an epoxide equivalent of 140–165.

Example 20

100 parts of product 4.
100 parts of product (C)–4: glycidyl polyether of cardol having an epoxide equivalent of 400–500.

Example 21

100 parts of product 5.
300 parts of product (C)–1 identified in Example 17 above.

Example 22

100 parts of product 6.
20 parts of product (C)–2 identified in Example 18 above.

Example 23

100 parts of product 7.
200 parts of product (C)–3 identified in Example 19 above.

Example 24

100 parts of product 8.
30 parts of product (C)-4 identified in Example 20 above.

Example 25

100 parts of product 9.
200 parts of product (C)-1.

Example 26

100 parts of product 10.
150 parts of product (C)-2.

Example 27

100 parts of product 11.
500 parts of product (C)-1.

Example 28

100 parts of product 12.
200 parts of product (C)-2.

Example 29

100 parts of product 13.
200 parts of product (C)-3.

Example 30

100 parts of product 14.
600 parts of product (C)-1.

Example 31

100 parts of product 15.
700 parts of product (C)-2.

Example 32

100 parts of product 16.
600 parts of product (C)-1.

Compositions of the respective formulations set forth in the aforesaid Examples 1-32 herein may be heated together in the temperature range of 150-300° F. while being mixed to provide stable and substantially uniform solutions, hereinafter known as products 1-32 respectively.

Said products 1-32 are all capable of being converted to the solid state by the use of certain hardening or curing agents either with or without the use of heat depending upon the particular products 1-32, particular agent and proportion of such agent employed. Among some of the agents which may be employed for that purpose are those amines which are capable at room or elevated temperatures of converting product C-1 herein to the solid state, such amines being known to the art. In general, the ratio of amine employed is about 5-30 parts for each 100 parts of such particular product 1-32 to which they are added. When the amines are employed, I may also use a phenol such as hydroxy benzene, resorcinol, and alkyl substituted phenols. Still another class of agents which may be employed for converting such products to the solid state are the various mineral acids and the amounts thereof may vary depending upon the particular product 1-32 to which such agents are added.

For examples, products 1-10 and 17-32 may be converted to the solid state at room temperature by merely mixing therewith 10-15 parts by weight of diethylene triamine, triethylene tetramine or diethyl amino propyl amine for each 100 parts of said products, with or without 2-5 parts of resorcinol, a $C_3$ or $C_4$ meta substituted alkyl phenol. Such mixtures are allowed to stand at room temperature for 72-144 hours and after that period will be found to have been converted to the solid state. Products 1-32 may be converted to the solid state by adding thereto, for example, a 10% by weight of a mixture consisting of equal parts of phenyl sulphonic and butyl phosphoric acids and such mixtures, after being maintained at 100-120° C. for ½ to 2 hours will be found to be in the solid state.

These various novel products, examples of which are products 1-32 find application as coating compositions, laminating compositions, potting compounds and in various other fields. For example, they all may be respectively dissolved in appropriate organic solvents, such as acetone, alcohol, toluene, benzene, carbon tetrachloride, xylene, etc., to provide solutions of desired viscosity and to such solutions may be added said agents, and such mixtures may be spread as a film or otherwise treated, to remove the solvent and convert them to the solid state. For example, such mixtures may be used for coating wooden or metal parts, which are then heated to drive off the solvent and then maintained at elevated temperatures of about 110° C. for ½ to 2 hours to provide excellent coatings of high heat resistance and high chemical resistance.

The following are examples, given merely by way of illustration of some other novel products of the invention, including a hardening agent as a component thereof, all parts given by weight unless otherwise specified.

Example 33

100 parts of product 1.
10 parts of diethylene triamine.

Example 34

100 parts of product 1.
10 parts of diethylene triamine.
3 parts of metabutyl phenol.

Example 35

100 parts of product 4.
10 parts of diethylene triamine.

Example 36

100 parts of product 4.
10 parts of diethylene triamine.
2 parts of metabutyl phenol.

Example 37

100 parts of product 17.
10 parts of diethylene triamine with or without
2 parts of meta butyl phenol.

Example 38

100 parts of product 18.
10 parts of diethylene triamine with or without
5 parts of resorcinol.

Compositions of the respective formulations of Examples 33-38 may be provided by mixing the components thereof together and they may be hardened or cured by allowing them to stand at room temperature for 1 week after which time they will be found to be in the solid state, or if desired, they may be allowed to stand at room temperature for 24 hours and then maintained at 100° C. for about 2 hours.

Example 39

100 parts of product 11.
5 parts of phenyl sulphonic acid.
5 parts of butyl phosphoric acid.

The composition of the formulation of Example 39 was maintained at room temperature (70° F.) for 168 hours at the end of which period it was found to be in the solid state.

Since certain changes in carrying out the aforesaid process and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to our novel compositions of matter herein claimed without departing from the spirit of the invention. Particularly it is to be understood that in said claims, ingredients or components recited in the singular are intended to include compatible mixtures of said ingredients wherever the sense permits.

Having thus described my invention, what I claim is:

1. A composition of matter comprising (A) normally liquid material selected from the group consisting of (1) materials having the following average formula:

$$HS-(C_2H_4-O-CH_2-O-C_2H_4-S-S)_n-C_2H_4-O-CH_2-O-C_2H_4SH$$

in which $n$ is a value of approximately 3–23 and (2) materials having the following average formula:

$$X-(CH_2CH_2SS \cdot CH_2CH_2O)_y CH_2CH_2SS \cdot CH_2CH_2-X$$

in which X is selected from the group of OH and SH and $y$ is a value of approximately 3–40, intimately combined with (B) material liquid at 300° F. and selected from the group consisting of (a) monofurfural-ketone, (b) difurfural-ketone, (c) mixtures of (a) and (b), (d) homopolymers of (a)–(c) respectively, (e) partially hydrogenated (a)–(d) respectively produced by saturating (a)–(d) respectively with hydrogen to an extent of approximately 15%–65% of that necessary to saturate with hydrogen all of the carbon to carbon double bonds therein, (f) homopolymers of said partially hydrogenated (a)–(d) respectively, (g) organic reaction products produced by reacting (a)–(f) respectively with a phenol-reactive aldehyde.

2. A composition of matter comprising (A) normally liquid material selected from the group consisting of (1) materials having the following average formula:

$$HS-(C_2H_4-O-CH_2-O-C_2H_4-S-S)_n-C_2H_4-O-CH_2-O-C_2H_4SH$$

in which $n$ is a value of approximately 3–23 and (2) materials having the following average formula:

$$X-(CH_2CH_2SS \cdot CH_2CH_2O)_y CH_2CH_2SS \cdot CH_2CH_2-X$$

in which X is selected from the group of OH and SH and $y$ is a value of approximately 3–40, intimately combined with (B) a mixture of monofurfural-ketone and difurfural-ketone.

3. A composition of matter comprising (A) normally liquid material selected from the group consisting of (1) materials having the following average formula:

$$HS-(C_2H_4-O-CH_2-O-C_2H_4-S-S)_n-C_2H_4-O-CH_2-O-C_2H_4SH$$

in which $n$ is a value of approximately 3–23 and (2) materials having the following average formula:

$$X-(CH_2CH_2SS \cdot CH_2CH_2O)_y CH_2CH_2SS \cdot CH_2CH_2-X$$

in which X is selected from the group of OH and SH and $y$ is a value of approximately 3–40, intimately combined with (B) partially hydrogenated difurfural-ketone produced by combining hydrogen with difurfural-ketone to an extent of about 15–65% of that necessary to completely saturate with hydrogen all of the carbon to carbon double bonds therein.

4. A composition of matter comprising (A) normally liquid material selected from the group consisting of (1) materials having the following average formula:

$$HS-(C_2H_4-O-CH_2-O-C_2H_4-S-S)_n-C_2H_4-O-CH_2-O-C_2H_4SH$$

in which $n$ is a value of approximately 3–23 and (2) materials having the following average formula:

$$X-(CH_2CH_2SS \cdot CH_2CH_2O)_y CH_2CH_2SS \cdot CH_2CH_2-X$$

in which X is selected from the group of OH and SH and $y$ is a value of approximately 3–40, intimately combined with (B) difurfural-ketone.

5. A composition of matter comprising (A) normally liquid material selected from the group consisting of (1) materials having the following average formula:

$$HS-(C_2H_4-O-CH_2-O-C_2H_4-S-S)_n-C_2H_4-O-CH_2-O-C_2H_4SH$$

in which $n$ is a value of approximately 3–23 and (2) materials having the following average formula:

$$X-(CH_2CH_2SS \cdot CH_2CH_2O)_y CH_2CH_2SS \cdot CH_2CH_2-X$$

in which X is selected from the group of OH and SH and $y$ is a value of approximately 3–40, intimately combined with (B) homopolymerized difurfural-ketone liquid at 300° F.

6. A composition of matter comprising glycidyl polyether of dihydric phenol intimately combined with a composition of matter defined in claim 1.

7. A composition of matter comprising glycidyl polyether of dihydric phenol intimately combined with a composition of matter defined in claim 2.

8. A composition of matter comprising glycidyl polyether of dihydric phenol intimately combined with a composition of matter defined in claim 3.

9. A composition of matter comprising glycidyl polyether of dihydric phenol intimately combined with a composition of matter defined in claim 4.

10. A composition of matter comprising glycidyl polyether of dihydric phenol intimately combined with a composition of matter defined in claim 5.

11. A composition of matter produced by hardening a composition of matter defined in claim 1 in the presence of a hardening agent.

12. A composition of matter produced by hardening a composition of matter defined in claim 6 in the presence of a hardening agent.

References Cited in the file of this patent

UNITED STATES PATENTS

| | | |
|---|---|---|
| 2,363,615 | Patrick | Nov. 28, 1944 |
| 2,363,829 | Caplan et al. | Nov. 28, 1944 |
| 2,461,510 | Harvey | Feb. 15, 1949 |
| 2,516,317 | Harvey | July 25, 1950 |
| 2,600,403 | Harvey | June 17, 1952 |
| 2,728,748 | Davis | Dec. 27, 1955 |
| 2,735,829 | Wiles | Feb. 21, 1956 |